United States Patent [19]

May et al.

[11] Patent Number: 5,173,051
[45] Date of Patent: Dec. 22, 1992

[54] CURRICULUM PLANNING AND PUBLISHING METHOD

[75] Inventors: Theodore May, Layfayette, N.J.; Ronald Chalmers, New Hyde Park, N.Y.; Timothy Walker, Long Valley, N.J.; William Clark, Bedminster, N.J.; Anne Dudley, Basking Ridge, N.J.

[73] Assignee: Optical Data Corporation, Warren, N.J.

[21] Appl. No.: 776,174

[22] Filed: Oct. 15, 1991

[51] Int. Cl.⁵ .................. G09B 19/00; G09B 17/00; A47B 41/00
[52] U.S. Cl. .................. 434/118; 434/178; 434/433
[58] Field of Search .............. 434/307, 323, 433, 178, 434/118

[56] References Cited

U.S. PATENT DOCUMENTS

| | | | |
|---|---|---|---|
| 4,020,468 | 4/1977 | Silver et al. | 434/307 |
| 4,609,358 | 9/1986 | Sangster | 434/307 |
| 4,634,386 | 1/1987 | Tamaki | 434/323 |
| 4,715,818 | 12/1987 | Shapiro et al. | 434/118 |
| 4,941,829 | 7/1990 | Estes et al. | 434/118 |
| 5,002,491 | 3/1991 | Abrahamson et al. | 434/322 |

Primary Examiner—Cary E. O'Connor
Assistant Examiner—Cindy A. Cherichetti
Attorney, Agent, or Firm—Lieberman Rudolph & Nowak

[57] ABSTRACT

A curriculum planning and publishing method and system is provided in which large quantities of information may be rearranged to produce a customized learning tool. This learning tool may embody a variety of formats ranging from a simple book to a computer and video multisensory presentation. Providing a customized learning experience maximizes effective learning time, places the teacher in better control of the classroom, and allows a school or school district to cater to the needs of the community while maintaining a uniform curriculum.

2 Claims, 7 Drawing Sheets

| | File | Edit | Go | Tools | Objects | Functions | |
|---|---|---|---|---|---|---|---|

| GRADE 1 | GRADE 2 | GRADE 3 |
|---|---|---|
| + What is Science? | -Our World | + What is Science? |
| + Plants | Places on Earth: World tour | + Matter and Energy |
| + All about me | Places on Earth: Grasslands | + Motion and forces |
| - Animals | Places on Earth: Deserts | + Work and Machines |
| What is an animal? : Animals on parade | Places on Earth: Rain forests | + Light |
| What is an animal? : Animals big and small | Places on Earth: Cold Places | + Electricity and Magnets |
| What is an animal? : Body coverings | Places on Earth: Watery places | |
| What is an animal? : Is it plant or animal? | Seasons: Times of the year | |
| Animals move: Ways animals move | Seasons: Spring | |
| Animals move: Wings, Legs, fins | Seasons: Summer | |
| Animals move: Fly, walk, swim | Seasons: Fall | |
| Animals eat: What do animals eat ? | Seasons: Winter | |
| Animals eat: How animals get food | Sharing our world: Our neighborhood | |
| Animals eat: Lions don't hunt grass | Sharing our world: What's wrong? | |
| Animals eat: Food chains | Sharing our world: Making it right | |
| Animals eat: Food webs | Sharing our world: Neighbors in danger | |
| Animals communicate: How animals communicate | Sharing our world: ......o the rescue! | |
| Places on Earth: Forests | +What is Science? | |
| Animals Communicate: Why animals Communicate | +Earth in Space | |
| Animal babies: Parents and babies | +Earth's Weather | |
| Animal babies: New babies | +Surface features | |
| Animal babies: All babies look different | +Fossils and dinosaurs | |
| | +Earth's resources | |

File   Edit   Go   Tools   Objects   Functions

| GRADE 1 | GRADE 2 | GRADE 3 |
|---|---|---|
| + What is Science?<br>+ Plants<br>+ All about me<br>- Animals<br>  What is an animal? : Animals on parade<br>  What is an animal? : Animals big and small<br>  What is an animal? : Body coverings<br>  What is an animal? : Is it plant or animal?<br>  Animals move: Ways animals move<br>  Animals move: Wings, Legs, fins<br>  Animals move: Fly, walk, swim<br>  Animals eat: What do animals eat ?<br>  Animals eat: How animals get food<br>  Animals eat: Lions don't hunt grass<br>  Animals eat: Food chains<br>  Animals eat: Food webs<br>  Animals communicate: How animals communicate<br>  Places on Earth: Forests<br>  Animals Communicate: Why animals Communicate<br>  Animal babies: Parents and babies<br>  Animal babies: New babies<br>  Animal babies: All babies look different | -Our World<br>  Places on Earth: World tour<br>  Places on Earth: Grasslands<br>  Places on Earth: Deserts<br>  Places on Earth: Rain forests<br>  Places on Earth: Cold Places<br>  Places on Earth: Watery places<br>  Seasons: Times of the year<br>  Seasons: Spring<br>  Seasons: Summer<br>  Seasons: Fall<br>  Seasons: Winter<br>  Sharing our world: Our neighborhood<br>  Sharing our world: What's wrong?<br>  Sharing our world: Making it right<br>  Sharing our world: Neighbors in danger<br>  Sharing our world: ......o the rescue!<br>+ What is Science?<br>+ Earth in Space<br>+ Earth's Weather<br>+ Surface features<br>+ Fossils and dinosaurs<br>+ Earth's resources | + What is Science?<br>+ Matter and Energy<br>+ Motion and forces<br>+ Work and Machines<br>+ Light<br>+ Electricity and Magnets |

Fig. 1

Unit View 8.27.91

All about me | Planning

CONTENT SUMMARY

If you ever have watched a ballerina do a pirouette or a shortstop throw a runner out, you have witnessed one of the most amazing phenomena in nature - the human body in motion. Have you ever stopped to wonder at the calculations a shortstop's brain must make to catch and throw the ball in one move? Our bodies truly are amazing!

In "All about me" students have the opportunity to gain an appreciation for the many things their bodies can do. There are many things we do daily using our hands, arms, legs and feet that we take for granted. How much time do you spend thinking about your joints? Think how difficult it would be to do something as simple as writing your name without them! In this unit students learn all about the parts of their bodies that are so vital to their everyday lives.

After students have learned about their bodies they naturally will want to

Fig. 2

S/L View 8.27.91

PRIMARY SCIENCE - Volume I
Our world
Section 3 - Sharing our world
5.3.5 To the rescue!

Our world: Sharing our world: To the rescue!  S 153248   1

Content: ways to help protect endangered organisms

Concepts : none

Activity: Endangered T-shirts

Reading activity: Sharing our world

Lesson enabling objective: Generate ideas on ways we can help protect endangered organisms 47093  • TO THE RESCUE!
47094  Lion and tourists in park
47905  Deer and boy in park
47906  Fur coat
47907  Movie: "Sheep Shearing" ; stereo ; 34 seconds duration
48927  "No Ivory" sign
48928  Protected eagle
48929  Protected manatees
48930  • SIDE MENU
ACTIVITY : Endangered T-shirts A28992
REFLECTION: To the rescue!
•READING: Sharing our world
ILLUSTRATED GLOSSARY G3822

Fig. 3

Activity View 8.27.91

GRADE ONE - Volume I
Unit 5 - Our world
Section 3 - Sharing our world
5.3.5 To the rescue!

PRIMARY SCIENCE - Volume I
Our world
Secection 3 - Sharing our world
5.3.5 To the rescue!

104 | Activity : Endangered T-Shirts

ACTIVITY MATERIALS
T-shirts, fabric paints, ( or crayons, an iron and waxed or brown paper )

ACTIVITY PREPARATION
If you are using an iron, prepare a place to iron the T-shirts, such as a table with a towel.

PROCEDURE FOR THE STUDENTS
Have students color slogans and/or pictures on their T-shirts that show ways they are good neighbors to other living things. If the students use crayons, you, the teacher, can make the drawings permanent. Place a piece of waxed or brown paper over the crayon marks and iron on a low setting until the crayons set

Fig. 5

Illustrated Glossary

EARTH SCIENCE - Volume I  GRADE FIVE - Volume II - Side 6

S62481  6  Glossary: Weathering and erosion

| | | |
|---|---|---|
| 42087 | AGENT OF EROSION | |
| 42088 | Stream moving rocks; diagram | |
| 42092 | BEDROCK | |
| 42093 | Formation of soil; diagram | |
| 42097 | CARBONIC ACID | |
| 42098 | Acid being dropped onto limestone | |
| 42102 | CAVERN | |
| 42103 | Formation of a cavern; diagram | |
| 42107 | CHEMICAL WEATHERING | |
| 42108 | Chemical weathering; diagram | |
| 42112 | CUTTING TOOLS | |
| 42113 | Cutting tools; diagram | |
| 42117 | DELTA | |
| 42118 | Fan-shaped delta | |
| 42122 | DISSOLVE | |
| 42123 | Salt and water | |
| 42127 | DUNE | |
| 42128 | Sand dune shown with people for scale | |

Fig. 6

Reservoir

EARTH SCIENCE - Volume I  
Weathering and erosion

GRADE FIVE - Volume II - Side 6  
Unit 10 - Weathering and erosion

S62481 7 Reservoir : Weathering and erosion

```
42202  RESERVOIR
42203  Cavern scene;   stalactites
42204  Cavern scene;   fountain
42205  Cavern scene;   large room
42206  Cavern scene
42207  Cavern scene
42208  Cavern scene
42209  Cavern scene
42210  Cavern scene;   columns and stalactites
42211  Cavern scene;   stalactites
42212  Cavern scene;   large room
42213  Cavern scene;   stalactites
42214  Cavern scene;   stalactites close-up
42215  Cavern scene;   stalagmite
42216  Cavern scene;   boat tour
42217  Gravestone;     dated 1833, badly weathered; close-up
42218  Gravestone;     dated 1845, weathered; close-up
```

Fig. 7

CURRICULUM PLANNING AND PUBLISHING METHOD

BACKGROUND OF THE INVENTION

Educational methods employing a multi-sensory approach have been found to be most effective in promoting learning. Moreover, reducing distractions focuses a student's attention on the material being taught. With this in mind, the subject invention was developed. By using the subject method and system, an educator is able to focus a student's attention on the material to be learned, while providing a multi-sensory, multi-dimensional presentation. As a result of this, students effectively assimilate information.

Schools and school districts are typically overwhelmed with discs, books, visual aids, etc. containing hundreds of thousands of images and binders containing several thousand pages of content. Although they can easily determine the use of the primary materials by placing them into grades 1, 2 and 3, etc., what do they do with the remaining materials? First, they have to fit this wealth of information into an existing lesson plan or develop a new one. To make this formidable task time effective and efficient, curriculum planning and publishing software has been developed. The subject method and system is a tool for navigating through educational material, customizing or modifying its content, or creating new teaching materials. Thus, the subject invention provides a solution to a long felt need in the art.

The curriculum planning and publishing method and system therefore described in the subject application, provides a comprehensive learning package which can be modified and customized for an individual, school or school district. It is, therefore, a general object of the subject invention to provide an efficient and effective method for conveying information from an information source to an information repository. In addition, an object of the subject invention is to provide a complete data base which can be accessed and organized into a curriculum for conveying information from an information source to an information repository. Moreover, an object of the subject invention is to integrate the curriculum (this includes customized books and teacher lessons generated through this system) with a videodisc player which can selectively play portions of a videodisc corresponding to the designated areas in the curriculum.

SUMMARY OF THE INVENTION

The subject invention provides a curriculum planning and publishing system employing (i) a data storage device having recallable information capable of being conveyed from an information source to an information repository, (ii) means for selecting and segregating portions of the information to be conveyed from an information source to an information repository, (iii) means for ordering the selected and segregated portions of information, and (iv) means for translating the ordered information into a format that can be conveyed from an information source to an information repository.

Selecting, segregating and ordering information is typically performed by a programmed computer, and means for translating the information into a format that can be conveyed from an information source to an information repository preferably comprises printing the translated information.

Under typical circumstances, the information repository is a human student desirous of assimilating the information and the information source is a human teacher. However, a computer may also function as the information source.

The subject curriculum planning and publishing system generally includes a videodisc player that is interfaced with a videodisc and is capable of selecting a portion of the videodisc to play when prompted.

In a common mode of using the subject system, a school or school district purchases a CD-ROM (compact disk-read only memory) containing a vast array of recallable information. The information is presented to a curriculum planner who selects and orders the information to be used in a given course of study. Teachers editions, outlines of the course materials, etc. may also be printed. The subject program then translates and prints the information, thus yielding one or more versions of a custom designed book for use by each student in multimedia program. These printed materials may have bar coded sections which can be optically scanned to access selected areas of a videodisc thereby integrating a video display with the teacher's presentation of the lesson.

The subject invention also teaches a method of curriculum planning and publishing. This method involves (i) providing recallable information capable of being conveyed from an information source to an information repository, (ii) selecting and segregating portions of the information to be conveyed from an information source to an information repository, (iii) ordering the selected and segregated portions of information, and (iv) translating the ordered information into a format that can be conveyed from an information source to an information repository.

Selecting and segregating involves isolating discrete units of information encoded on a computer disk, and translating comprises printing the ordered information. Printing is to be interpreted as a means for conveying information and includes printing to a computer disc or paper. Translating may also involve prompting a videodisc player to display a pre-selected section of a videodisc. As discussed above, this may be accomplished by embossing coded material onto a curriculum to prompt a computer or videodisc player. Any suitable means of coding may be employed and may comprise a bar code.

BRIEF DESCRIPTION OF THE FIGURES

FIG. 1 — Screen of "table of contents" for "Windows on Science" grades 1-3 units.

FIG. 2 — Screen of "unit view" for "Sounds Like Fun" showing the content summary of this unit.

FIG. 3 — Screen of "section/lesson view" for "Sounds Like Fun: The Doppler Effect" showing details of this lesson.

FIG. 5 — Screen of "Activities" for "Activity: Model of Crater Formation" showing details of the activity preparation and procedure.

FIG. 6 — Screen of "Glossaries" for "Sounds Like Fun" showing choices of words and diagrams for indecision into the glossary.

FIG. 7 — Screen of "Reservoirs" for "Sounds Like Fun" showing lesson which might still be included in the curriculum.

DETAILED DESCRIPTION OF THE INVENTION

Figure 4:
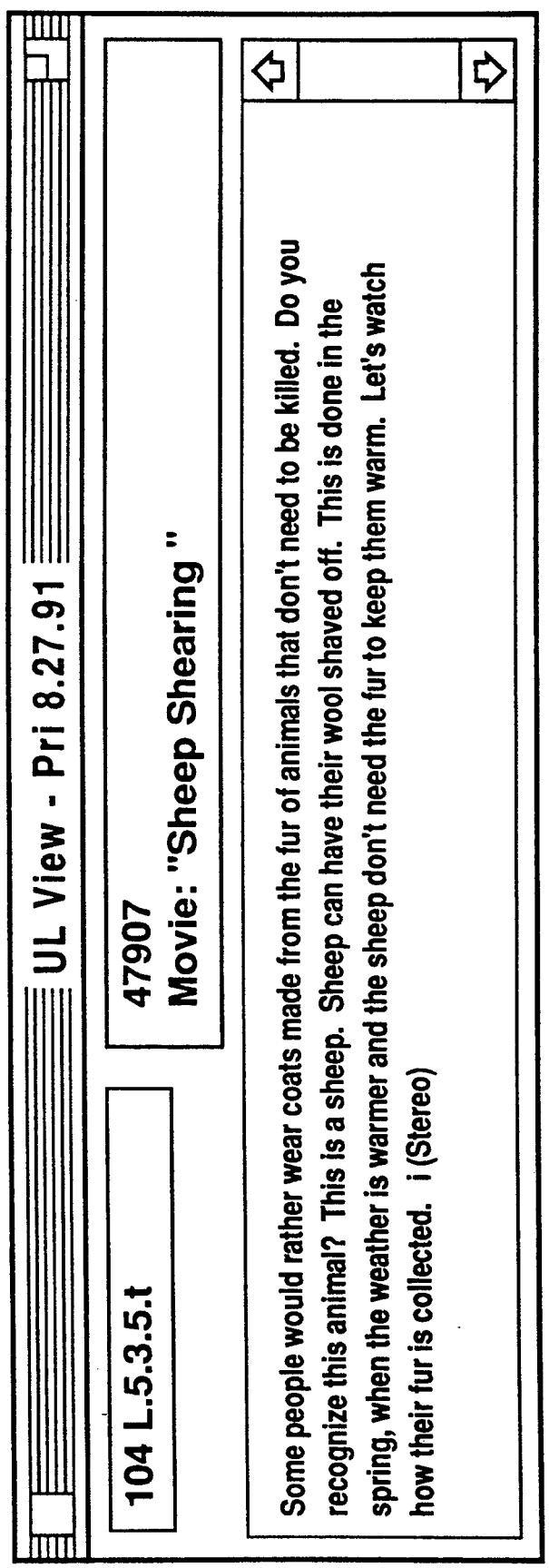
FIG. 4 — Screen of "video/lesson view" for the movie "Doppler Effect of a Plow Train" showing a synopsis of this movie.

The subject curriculum planning and publishing method and system therefore, together with its associated software, allows schools to develop their own educational programs. Entire school districts may also utilize the subject method and system to create and publish their own curriculum by deciding which units, modified units or newly created units to use from existing source material found on a CD-ROM and series of disks. A sequential teacher's edition and activity workbook may be generated based on an educator's choice of lessons. Teachers receive lessons and activities that originate from materials which have been personalized by the school district.

The subject computer program allows a quick casual browse to gain insights into the educational program selected (for example, the "Windows on Science" program). Easy to use menus guide the user through the program to visualize unit and activity summaries, allowing a quick and easy preview of all materials or a subset of the materials without opening each binder. Hard copies of desired summaries may also be obtained.

An extended browse feature allows a school district to develop a district wide educational program. For example, Windows on Science can be fitted into their existing scope and sequence or their vision of how science should be taught. A general summary of each unit is provided as a starting point. The user may then delve deeper into a unit, sorting by topics, objectives, themes, grade level, and student activities. The user may go from the unit level to the section or lesson level. The linkage of a computer and a videodisc is essential to interpret the keystrokes and then to make decisions on how to modify lessons. At any point in the planning process a version of the current organization of units, sections and lessons may be saved. A previously saved version may be recalled at any time, and a synopsis of any version may be printed.

After investigation and review of these synopses has yielded a satisfactory version the user can then create the district's version having a given "scope and sequence". The end product of the planning phase of the subject process is a hard copy of the scope and sequence developed by manipulating unit section and lesson titles. Since these lessons may be in a non-linear format, events are normally bar coded. Changes to be saved for future use and notification of this modification should appear on the menus in the engine.

Once the scope and sequence for the district has been developed, the publishing phase of the subject process begins. By manipulating the supplied program content, the district may choose to use only parts of a unit, modify the order of the linear format, or change the content of the teacher or student written component. A district may use images from the educational program to create their own lessons from scratch (i.e., to repurpose the disc). A computer/videodisc linkage is essential for this activity. Starting with a data base of the print directory and by sorting content, index, key word, or theme, the user is able to obtain visuals for developing a story line or lesson. The user must have tools to review the visuals, select, save and reorganize and edit the list as necessary. Individual events may then be linked together and saved as a unit. Criteria filed in this new unit can be listed to become a part of the engine's menus. This requires a mechanism for saving and referencing newly created material. Typically, a word processor having spell check capability is implaced to develop the lesson plans, using various templates for page layout. Since newly developed lessons may draw on visuals in a non-linear format, each event may be bar coded. Flexibility is provided to accommodate tasks from the addition of new activities to the creation of a totally new textbook.

The user interface employed in the main "overview" window of the curriculum planning and publishing method and system generally utilizes a multi-column format. Each field also has a name which serves as a pointer to the location of data referred to in the field's title. Each field name preferably consists of a prefix (either "U" for unit or "S" for section) and a number corresponding to the card identification (stack address) of the unique data card with the summary data. For example, a particular unit title field appearing on the overview interface as "What is Physical Science?" might have the name "U12345", indicating that a summary of this unit is accessible on card 12345 of the unit ("U") data stack. In the "Windows on Science" program (used as an illustration throughout the subject application), each column represents a single grade or series. Within each column, "unit" titles are arranged in order, in a "table of contents" style. Users can interact with this interface in multiple ways with the underlying programming handling user input.

The particular program tracks the physical arrangement of title fields via several master list variables:

MasterUnitList has seven return-terminated lines, one for each column in the overview interface. Each line contains a command comma-delimited list of unit field names, in an order corresponding to their top-to-bottom position within the column. There are 57 items (field names) in MasterUnitList, one for each of the unit fields in the overview.

MasterSLList has 57 return-terminated lines, one for each unit field in the overview. Each line contains a comma-delimited list of section field names. There are 677 items (section names) in MasterSLList, one for each of the section fields in the Overview.

The YLocList variable maintains a list of the Y-coordinates of each visible title field, with one line for each column and a separate item for each object. The ScreenList variable maintains a corresponding list of visible field names.

Expanding or collapsing a unit will alter the constituents of YLocList and ScreenList but will not affect either MasterUnitList or MasterSLList. All four lists change whenever a unit or section is repositioned.

The incorporation of data pointers in the names of the overview title fields enables a user to rapidly look up summary data for units and sections. Similarly, pointers are incorporated in the name of each Section Data card to enable a user to rapidly look up event data cards for each section. In the latter case, the pointers consist of a prefix plus two numbers identifying the first and last event data card subsumed under each section.

The program uses MasterUnitList and MasterSLList to present data cards in a dynamic order (corresponding to the current overview arrangement) as users navigate through information. The first/last event data pointers are also used. For example, if a user is looking at the data card for the last event in a particular section, and clicks a button to go to the "next" event, the program knows: (1) that the user is on the last event of the section; (2) the address of the next section data card, based on a MasterSLList lookup; (3) the address of the first event data card for this next section, based on looking up the name of the section data card.

The following is an illustrative sample of options for accessing the subject software:

NAVIGATION — Table of Contents

Overview: expand/collapse unit titles, show sections/lesson titles
Unit View: summary information
Section/Lesson View: summary information, event lists
Video Lesson View: Lesson text
Activity, Illustrated Glossary, Reservoir views NAVIGATION — Index Free Text Search: Summaries, Event lists, lesson text, single side

CUSTOMIZATION

Rearrange Units, Section/Lessons
Save/Restore Versions
Delete/Undelete
Custom Columns

OUTPUT

Text search results
Report Generation
Scope and sequence reports: presentation and draft versions The following is an overview of navigation principles and organization found in the Windows on Science program:

```
1 OVERVIEW              2 UNIT VIEW
 |
3 SECTION/LESSON VIEW   5 ACTIVITY VIEW
 |                      6 ILLUSTRATED GLOSSARY
 |                      7 RESERVOIR
4 VIDEO LESSON VIEW
```

In Windows on Science, each window displays information about a particular subset of its content and the listed numbers reflect the order in which windows are to be described.

The term "section/lesson" serves as a bridge between the primary and intermediate programs, which utilize slightly different formats. In both programs, content is divided into units. In primary Windows on Science, each unit is subdivided into sections, with each section further subdivided into lessons. In intermediate, the content divisions are somewhat less regular: Units are subdivided into sections and (occasionally) into smaller sub-sections. In primary, a section/lesson is equivalent to a single lesson; in intermediate, it is usually equivalent to a section, but occasionally corresponds to a sub-section.

Individual "events" make up each section/lesson; these include video events, physical or mental activities and reading activities.

The overview window remains open and visible at all times, and depending on monitor size, other windows will open at specific, convenient screen locations. The name of each window (except for overview) is shown in the window's title bar and windows may be closed by clicking the "close box" at left side of its title bar.

Windows that are not closed (by the user or the program) remain visible on the screen. A visible window may be opened by clicking anywhere in the window. The first mouse click "activates" the window and brings it to the front of the display and a subsequent click may be opened to trigger a specific button or function within the window.

Using a mouse and screen pointer, users click on "plus" or "minus" signs preceding the unit titles to expand or collapse the table of contents display. FIG. 1 depicts a screen illustrative of such plus and minus signs being used. In a collapsed view, only unit titles are visible, whereas, in an expanded view, "section/lesson" titles are included within the unit also become visible. This approach follows a convention used in many outlining programs.

Each title of a unit or section/lesson shown on the overview is a software object (field) linked to various levels of underlying data. Clicking or double-clicking on title fields opens additional screen windows displaying content summaries, event sequences, lesson text, videodisc frames, and so on. Users may reposition any title field by clicking on it, dragging it to a new position, and "dropping" it into place. When unit titles are moved, the section/lessons they contain move with them. Repositioning titles in this way enables the user to revise overall organization, or scope and sequence. At any given point in time, the visible layout of titles in the overview window represents the user's customized scope and sequence.

The arrangement of title fields is tracked continuously via several global variables which maintain sequential lists of the columns, units and section/lessons in the overview window. When a user "saves" his/her current version of a scope and sequence, the program actually is storing the current state of these list variable. When a user "restores" a given version, the program actually is arranging the overview title fields according to the saved list.

In Windows on Science, the initial display shows seven columns, with headings according to mode (NA or TX). Typically, the overview is larger than the monitor screen and viewing other sections of the overview window accomplished by moving the mouse pointer to the edge of the screen. (Right edge, scroll to right; bottom edge, scroll down; etc.)

Columns 1-6 display the Windows on Science table of contents. Each column lists the units in a single series in order of occurrence. Initially, each unit title is preceded by a "+" sign, indicating that additional subtitles are present.

To expand the overview by revealing the section/lesson titles subsumed under a particular unit, the user clicks the unit's "+" sign once. The "+" sign will change to a "−" sign as the unit is expanded. To collapse the overview by concealing subsumed section/lesson titles, the unit's "−" sign is clicked once. To view summary information for a particular unit (open unit view window), the unit's title is double clicked. To view summary and event information for a particular section/lesson (open section/lesson view window), the section/lesson's title is double-clicked.

To view summary and event information for the first section/lesson in a collapsed unit, the option key is held down and the unit's title is double-clicked. This provides a "short cut" from the overview into the section/lesson/view window. The last title clicked will be highlighted with a box outline on the overview.

As a user navigates through data windows, the sequence in which data is displayed conforms to the current arrangement of the overview. For example, the unit view window (such as the window depicted in FIG. 2) presents one unit summary at a time; clicking left or right arrow buttons within the window displays the previous or next unit summary. If the user rearranges units ABC to BAC on the overview, the unit view window, and other windows, will subsequently display summaries in BAC order.

There is one card per Windows on Science unit; 56 total for columns 1-6. Cards provide summary information extracted from unit planning pages, in the main scrolling field on each card. The unit title shown in top field and the binder (and TX side) shown at left of field below title.

Current column heading is shown in parentheses at the right of binder field. Headings will be updated if scope and sequence is revised. By clicking the left and right arrow buttons, the user may step to the previous/next unit in current scope and sequence.

A Find Heading menu affords access to specific sections of each summary. To find a heading, the user clicks and holds the mouse down on find heading, the mouse is then moved down and released over desired heading. To browse through the headings, i.e., peruse the same heading from one unit to the next, the find heading menu is used. If the option key is held down when clicking a left or right arrow button, a new card appears with the current heading "cued up."

Primary and intermediate unit planning pages have slightly different headings. When browsing headings between primary and intermediate unit cards (or vice versa), the program may substitute an "equivalent" heading, as shown below:

| Primary | Intermediate |
| --- | --- |
| 1 Content summary | Video Lesson Plan |
| 2 Terminal objective | Objectives (2) |
| 3 Vocabulary | Vocabulary (3) |
| 4 Reinforcement activities | Activity materials |
| Reading activities | Reinforcement activities (4) |
| 6 Extension - enrichment | Home activities |
| 7 Assessment methods | Extension - enrichment (6) |
|  | Assessment methods (7) |
|  | Video lesson summary (1) |

Within each menu, items are listed in order as they appear in the planning pages. Numbers indicate "equivalent" headings as used in the browse headings mode.

To leave the unit view, the user closes its window or clicks in another window (e.g., overview). When the user returns to the overview, the title of the last unit examined in Unit View is highlighted with a box outline.

Other paths out of the unit view window include the menu items search card, Activities, Glossary, and Reservoir.

FIG. 3 shows an illustrative section/lesson screen in which the content of the lesson, the concepts to be taught, the activity to be performed by the class, the reading activity and the objective of the lesson are set forth. By referring to this screen, an educator can evaluate whether the particular lesson within a unit is suitable for the class. For example, a school district having a limited budget might opt to limit the number of lessons requiring expensive equipment or supplies. Conversely, a better equipped school might incorporate a larger number or more elaborate activities.

There is one card per Windows on Science section/lesson; 676 total for columns 1-6. Cards provide two scrolling fields. The left-hand field contains summary information (Lesson Enabling Objective/Content, Concepts, Activity, Reading activity) and the right-hand field contains event information. The top field shows "header" information, as applicable; binder (and TX side); unit number and title; section number and title; lesson/subsection title.

The current column heading is shown in parentheses at the top right of binder field and current unit heading shown in parentheses below column heading at right of binder field. Headings will be updated if scope and sequence is revised or customized.

Clicking the left and right arrow buttons allow a user to step to previous/next section/lesson in current scope and sequence.

For the summary field, line 1 of the primary program includes a lesson enabling objective and line 1 of the intermediate program includes content summary; line 2 lists concepts consecutively in order of introduction within the section/lesson; line 3 shows activities introduced or continued within the section/lesson (this is shown as "none" if there is no activity and the title is shown in parentheses if activity is continued, i.e., carried over from previous section/lesson); and line 4 depicts reading activity introduced within, or aligned with, the section/lesson (a title is shown in parentheses if a reading passage is aligned, i.e., draws upon this section/lesson's content but will be introduced later).

For the event field, a full print directory listing for the section/lesson, with supplemental entries for other activities and videodisc visuals is shown. Activity and reading activity titles appear at the point where each is normally introduced in the Windows on Science lesson. In the intermediate version, entries for the illustrated glossaries and reservoirs (each comprising a set of videodisc visuals distinct from the main lesson) appear at the point where their frames are stored on each Windows on Science videodisc.

Clicking once on an activity line opens the Activities view window with information about the selected activity; clicking once on a glossary line opens the Glossaries window with the frame directory listing for the selected glossary; and clicking once on a reservoir line opens the Reservoirs window with the frame directory listing for the selected reservoir.

Any event line starting with a number lists a video event. In the primary program, entries starting with "REFLECTION:" also denote video events. Clicking once on a video event line cues up the frame number shown in the line. (This assumes that the user has installed the correct Windows on Science videodisc volume). If the video event is a movie, the first frame of the movie will be cued up and the video control palette will appear.

Double-clicking on a video event line opens the video lesson view window with the lesson text for the selected video event. If the video event line starts with "0", the video event has no associated lesson text.

To exit the section/lesson view, the user closes its window or clicks in another window (e.g., overview). Upon returning to the overview, the title of the last section/lesson examined in section/lesson view is highlighted with a box outline. If the current section/lesson title is not visible (i.e., its unit has not been expanded), the unit title is highlighted instead.

Besides double-clicking a video event to open the video lesson view window, other paths out of the section/lesson view window include the menu items Activities, Glossaries, and Reservoir.

FIG. 4 shows an illustrative screen of a synopsis of a visual aid (in this case a movie) which can be used in connection with a section/lesson. In the present example, the movie "Doppler Effect of a Plow Train" may be shown in connection with the section/lesson set forth in FIG. 3.

There is one card per Windows on Science event. The scrolling field contains the lesson note accompanying each event in the video lesson. An "event" is typically a video event, but may also consist of one or more paragraphs under a separate heading, such as activity materials, activity preparation, reflection, etc.

The top field shows event information, as applicable: video frame number, event caption, heading. Clicking left and right arrow buttons steps to the previous/next event in current section/lesson. Upon reaching the last event of a section/lesson, clicking the right arrow brings up the first event in the next section/lesson in the current scope and sequence (i.e., as shown on overview). From the first event of a section/lesson, clicking the left arrow brings up the last event in the previous section/lesson. Thus, the events always appear in proper sequence.

The video lesson view window works in conjunction with the section/lesson view window. The header (binder/unit/title information) displayed in the Section/Lesson view window applies to each event in the current Video Lesson. This header is updated each time the user enters a new section/lesson while navigating through cards in the Video Lesson view.

The video lesson view is especially useful for examining lesson notes and videodisc visuals together. After connecting a videodisc player and installing the correct Windows on Science volume, stepping to a new video event card will bring up the videodisc frame for the event (see above).

Other paths out of the video lesson view window include the menu items Search Card, Activities, Glossary, and Reservoirs. Opening or re-opening any other window automatically closes the video lesson view window.

FIG. 5 shows an illustrative screen of a synopsis of an activity to be performed by a class which can be used in connection with a section/lesson. In the present example, the activity "Model of Crater Formation" is described. This activity is meant to be performed in connection with the section/lesson set forth in FIG. 3.

As can well be imagined, choices of visual aids and activities used within a section/lesson, coupled with the choice of section/lesson, makes the subject method and system extremely flexible and allows for crafting a curriculum focused to the audience being taught.

FIG. 6 shows an illustrative screen of a glossary to be utilized in connection with a section/lesson. By selecting the words to be included in the lesson, an educator can design a lesson which accurately reflects the extent of vocabulary that a student is required to obtain. To better aid the student, the glossary is typically illustrated and multi-sensory glossaries are envisioned which couple a computer to a videodisc player. In such situations, the student can see and hear the glossary as well as read it.

FIG. 7 shows an illustrative screen of a reservoir of remaining sections/lessons which may be incorporated into the final curriculum.

Curriculum publishing software enables a user to generate various reports synopsizing any current or saved version of their scope and sequence. These reports serve to document curriculum team's decision-making process. The final scope and sequence report serves as a "road map" specifying the order in which pages should be published, e.g., in Windows on Science, by using the "Pagemaker" files supplied as part of the curriculum publishing (for convenience, the Windows on Science or other data program, together with the subject curriculum planning and publishing method and systems therefore, may be sold as a kit). A printed report may serve as the bridge between the planning and publishing components of the product.

The combination of a comprehensive table of contents overview with the click-and-drag ability to rearrange this layout (generating a new presentation sequence for underlying data and thus a new curriculum Scope and Sequence) provides a unique, direct-manipulation solution to the problem of information management.

Upon reading the subject application various embodiments will become obvious to these skilled in the art. These variations are to be considered within the scope and spirit of the subject invention. Moreover, the examples and text set forth above are to be considered as representative of the subject invention, but are not to be construed as limiting. The subject application is only to be limited by the claims which follow and their equivalents.

What is claimed is:

1. A method of curriculum planning and publishing which comprises:
   (a) providing recallable information capable of being conveyed from an information source to an information repository;
   (b) selecting and segregating portions of the information to be conveyed from an information source to an information repository;
   (c) ordering the selected and segregated portions of information;
   (d) translating the ordered information into a curriculum that can be conveyed from an information source to an information repository; and
   (e) providing coded material onto the curriculum to prompt a computer or videodisc player.

2. A method of claim 1, wherein the coded material comprises a bar code.

* * * * *

US005173051B1

REEXAMINATION CERTIFICATE (3217th)

United States Patent [19]

May et al.

[11] B1 5,173,051

[45] Certificate Issued Jun. 10, 1997

[54] CURRICULUM PLANNING AND PUBLISHING METHOD

[75] Inventors: Theodore May, Layfayette, N.J.; Ronald Chalmers, New Hyde Park, N.Y.; Timothy Walker, Long Valley, N.J.; William Clark, Bedminster, N.J.; Anne Dudley, Basking Ridge, N.J.

[73] Assignee: Optical Data Corporation, Warren, N.J.

Reexamination Request:
No. 90/003,235, Oct. 28, 1993

Reexamination Certificate for:
Patent No.: 5,173,051
Issued: Dec. 22, 1992
Appl. No.: 776,174
Filed: Oct. 15, 1991

[51] Int. Cl.$^6$ .................. G09B 19/00; G09B 17/00; A47B 41/00
[52] U.S. Cl. .................. 434/118; 434/178; 434/365; 434/433
[58] Field of Search .................. 434/118, 178, 434/307, 323, 433, 169, 307 R, 307 A, 308, 317, 350, 362, 365

[56] References Cited

PUBLICATIONS

LaserBarcode System Guide Book–Pioneer Electronic Corp., 1989 (29 sheets).

Heath–Biology Teacher's Edition—D.C. Heath and Company, 1991 (7 Sheets).

Lesson Maker—Optical Data Corporation, 1989, (five chapters consisting of 16 sheets).

Zebra Writer Ver. 1.0—Demo Version, 1988, (pp. 1–2).

LaserBarcode Format—Pioneer Electronic Corporation, 1986, pp. 1–28).

Biology—The Dynamics of Life—Teacher Edition—Merrill Publishing Company, 1991, 6 pages.

Biology Today—Holt Rinehart and Winston, Inc., 1991 (2 pgs.).

Correlation of Optical Data's Life Science/Biology—Prentice Hall, 1991, (9 sheets).

The Living Textbook—Earth Science—Optical Data Corp., (14 Sheets).

trACE Curriculum Navigator, trACE Development Center, 1991, including 6 page supplement (total of 22 sheets).

*Primary Examiner*—Joe H. Cheng

[57] ABSTRACT

A curriculum planning and publishing method and system is provided in which large quantities of information may be rearranged to produce a customized learning tool. This learning tool may embody a variety of formats ranging from a simple book to a computer and video multisensory presentation. Providing a customized learning experience maximizes effective learning time, places the teacher in better control of the classroom, and allows a school or school district to cater to the needs of the community while maintaining a uniform curriculum.

| File Edit Go Tools Objects Functions |||
|---|---|---|
| GRADE 1 | GRADE 2 | GRADE 3 |
| + What is Science? | -Our World | + What is Science? |
| + Plants | Places on Earth: World tour | + Matter and Energy |
| + All about me | Places on Earth: Grasslands | + Motion and forces |
| - Animals | Places on Earth: Deserts | + Work and Machines |
| What is an animal? : Animals on parade | Places on Earth: Rain forests | + Light |
| What is an animal? : Animals big and small | Places on Earth: Cold Places | + Electricity and Magnets |
| What is an animal? : Body coverings | Places on Earth: Watery places | |
| What is an animal? : Is it plant or animal? | Seasons: Times of the year | |
| Animals move: Ways animals move | Seasons: Spring | |
| Animals move: Wings, Legs, fins | Seasons: Summer | |
| Animals move: Fly, walk, swim | Seasons: Fall | |
| Animals eat: What do animals eat ? | Seasons: Winter | |
| Animals eat: How animals get food | Sharing our world: Our neighborhood | |
| Animals eat: Lions don't hunt grass | Sharing our world: What's wrong? | |
| Animals eat: Food chains | Sharing our world: Making it right | |
| Animals eat: Food webs | Sharing our world: Neighbors in danger | |
| Animals communicate: How animals communicate | Sharing our world: ......o the rescue! | |
| Places on Earth: Forests | +What is Science? | |
| Animals Communicate: Why animals Communicate | +Earth in Space | |
| Animal babies: Parents and babies | +Earth's Weather | |
| Animal babies: New babies | +Surface features | |
| Animal babies: All babies look different | +Fossils and dinosaurs | |
| | +Earth's resources | |

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is cancelled.

Claim 2 is determined to be patentable as amended.

New claim 3 is added and determined to be patentable.

2. A method of claim [1] *3*, wherein the coded material comprises a bar code.

*3. A method of curriculum planning and publishing to create an editable textbook, which comprises:*

*providing recallable information capable of being conveyed from an information source such as a teacher, to an information repository such as a student, said recallable information including a print component capable of being stored in a computer and a video component stored in a videodisc storage medium for display by a video disc player, and said recallable information comprising a complete curriculum in a recallable and editable format,*

*selecting and segregating said print component and said video component of said recallable information to be conveyed from said information source to said information repository,*

*ordering and combining both the print component and the video component of said recallable information,*

*translating the ordered and combined print and video components of said recallable information into a customized lesson plan uniquely tailored to a particular teaching environment,*

*generating coded material for inclusion into said customized lesson plan to prompt retrieval of predetermined information from said computer or said video disc player, and*

*providing for said information source a complete customized lesson plan in printed or electronic format which can be further recalled or edited upon command.*

* * * * *